(12) United States Patent
Aschbacher et al.

(10) Patent No.: US 11,650,585 B1
(45) Date of Patent: May 16, 2023

(54) FAULT TOLERANT AUTONOMOUS VEHICLE PLATFORM

(71) Applicant: VAY TECHNOLOGY GMBH, Berlin (DE)

(72) Inventors: Nathan Aschbacher, Portland, OR (US); Joshua John Hartung, Portland, OR (US)

(73) Assignee: VAY TECHNOLOGY GMBH, Berlin (DE)

( * ) Notice: Subject to any disclaimer, the term of this patent is extended or adjusted under 35 U.S.C. 154(b) by 219 days.

(21) Appl. No.: 16/265,244

(22) Filed: Feb. 1, 2019

Related U.S. Application Data

(60) Provisional application No. 62/625,199, filed on Feb. 1, 2018.

(51) Int. Cl.
| | |
|---|---|
| G07C 5/08 | (2006.01) |
| G07C 5/00 | (2006.01) |
| B25J 9/16 | (2006.01) |
| H04L 9/06 | (2006.01) |
| B60L 9/00 | (2019.01) |
| B60W 10/00 | (2006.01) |
| B60W 20/00 | (2016.01) |
| B60W 10/06 | (2006.01) |
| B60W 10/08 | (2006.01) |
| B60W 50/14 | (2020.01) |
| G05D 1/00 | (2006.01) |

(52) U.S. Cl.
CPC .......... *G05D 1/0055* (2013.01); *G07C 5/085* (2013.01); *G07C 5/0816* (2013.01)

(58) Field of Classification Search
None
See application file for complete search history.

(56) References Cited

U.S. PATENT DOCUMENTS

| | | | |
|---|---|---|---|
| 9,205,834 B1* | 12/2015 | Uehara | B60W 10/06 |
| 10,395,444 B1* | 8/2019 | Edren | G07C 5/0808 |
| 10,599,546 B1* | 3/2020 | Walther | G06F 11/3013 |
| 2015/0057875 A1* | 2/2015 | McGinnis | G07C 5/0841 |
| | | | 701/31.6 |
| 2018/0047222 A1* | 2/2018 | Lewis | G07C 5/0808 |
| 2019/0160660 A1* | 5/2019 | Husain | H04L 9/0637 |

* cited by examiner

*Primary Examiner* — Adam D Tissot
*Assistant Examiner* — Laura E Linhardt
(74) *Attorney, Agent, or Firm* — Hogan Lovells US LLP

(57) ABSTRACT

Technologies are provided for detecting anomalous data at runtime in an autonomous vehicle component that is indicative of a byzantine fault, and providing real-time remediation. Input and output data streams of the vehicle component can be analyzed to generate a normal operational model for the vehicle component. Using the model, deviations from a known steady state of operation of the vehicle component can be detected and flagged as potential faults. The vehicle component can then be isolated and/or restarted. Additionally or alternatively, a specification can be defined that specifies allowed component interactions in the autonomous vehicle system. The specification can be used to generate tests that can be used to validate the functional correctness of the vehicle components. The specification can be used at run-time to detect component interactions that are not allowed. Such a disallowed component interaction can be detected using the specification and flagged as a potential fault.

20 Claims, 8 Drawing Sheets

FAULT TOLERANT AUTONOMOUS VEHICLE PLATFORM

RELATED APPLICATIONS

This application claims priority to U.S. Provisional Patent Application Ser. No. 62/625,199, filed on Feb. 1, 2018, entitled "FAULT TOLERANT AUTONOMOUS VEHICLE PLATFORM," which is incorporated by reference herein in its entirety.

BACKGROUND

Today, autonomous vehicles are being developed to navigate and operate unassisted by a vehicle operator, or to assist an operator in the operation of a vehicle. An autonomous vehicle can utilize many different types of components, such as sensors, control components, robotics, and other computer-controlled systems and mechanisms. Some automobile companies and other manufacturers are developing systems for interfacing with these different components and performing autonomous driving operations. However, developing such systems requires a diverse set of competencies, including robotics, machine learning, computer visualization, real-time embedded system development, etc. Furthermore, as mission-critical systems, there is a need for autonomous vehicle systems to operate in a safe and reliable manner.

DETAILED DESCRIPTION

I. General Considerations

Figure 1:
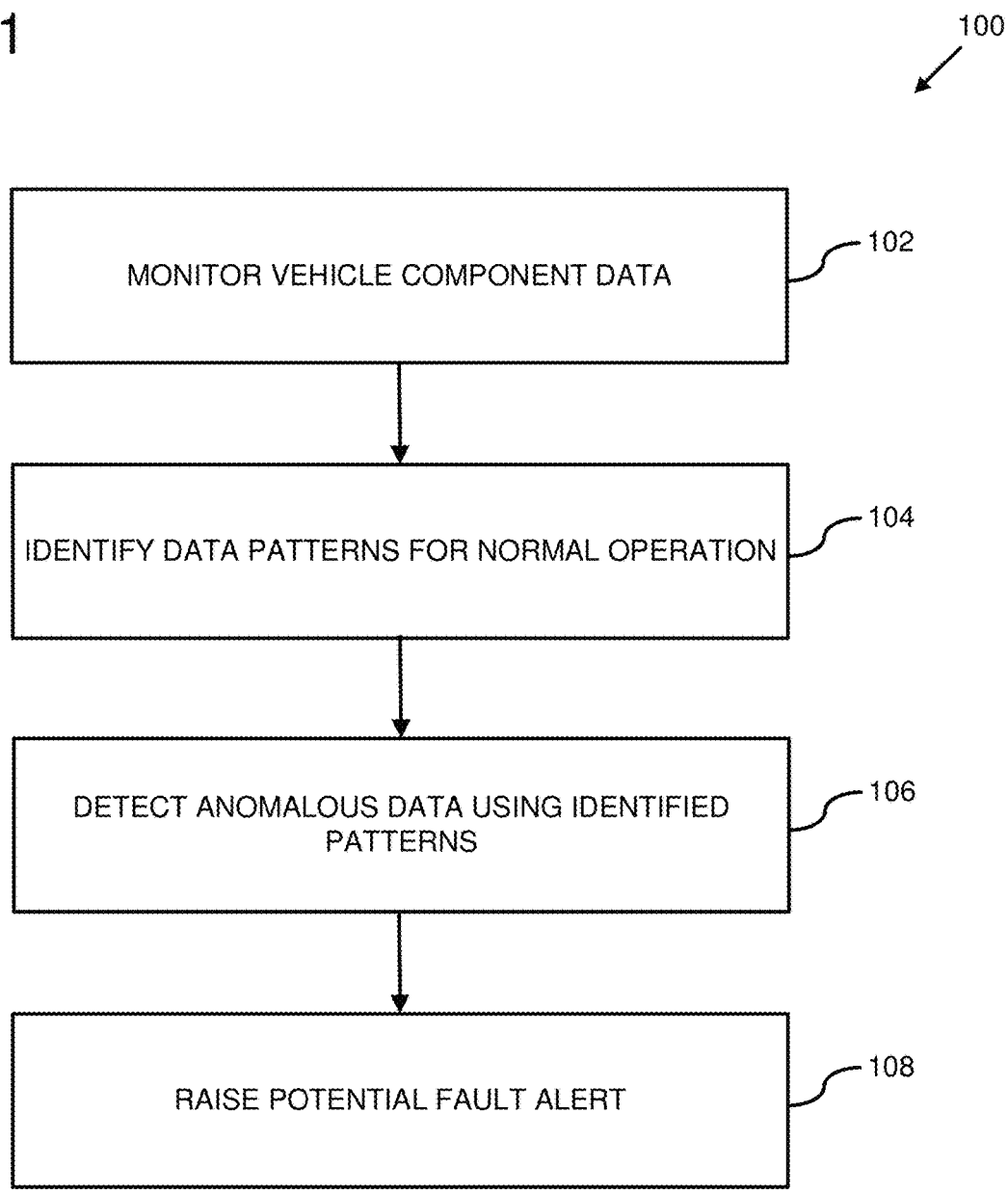
FIG. 1 is a flowchart of an example method for byzantine fault detection in an autonomous vehicle system.

Disclosed below are representative embodiments of methods, apparatus, and systems for improving the operation of autonomous vehicles. The disclosed methods, apparatus, and systems should not be construed as limiting in any way. Instead, the present disclosure is directed toward all novel and nonobvious features and aspects of the various disclosed embodiments, alone or in various combinations and sub-combinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

The innovations can be implemented as part of a method, as part of a computing system configured to perform the method, or as part of computer-readable media storing computer-executable instructions for causing a processing device (e.g., a circuit, such as a microprocessor or microcontroller), when programmed thereby, to perform the method. The various innovations can be used in combination or separately.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods can be used in conjunction with other methods.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Example Embodiments

Given the high-level of complexity of many autonomous vehicle systems, it is difficult, if not impossible, to prove that the software components of such a system are fault free. Formal methods for proving program correctness could be applied, in some cases, to embedded vehicle systems that were relatively simple and involved relatively small code bases. However, it can take a prohibitive amount of time and/or manpower to apply such methods to large, complex code bases. Furthermore, such methods may require a level of determinism that is not possible in autonomous vehicle systems. For example, such methods may not be able to provide a complete assurance of fault tolerance for a pluggable platform designed to interface with many different types of external components (such as different sensors, different control units control units, external application, etc.) since the external components in any given configuration may differ.

Various software testing methodologies can also be insufficient to prove that a given system is free of faults. Testing methodologies such as unit tests, integration tests, and functional tests can only establish that a given set of test cases pass or fail, and therefore cannot assure that a given component (or interaction between multiple components) is bug free. Some testing methodologies are designed to test complex systems by automatically generating inputs to various components in an attempt to detect cases that result in unexpected errors. Such methodologies can increase confidence that a complex system is fault-tolerant. However, many such approaches rely on the system's error handling (such as by raising exceptions, writing to an error log, etc.) to determine that a given input was erroneous. Such methodologies cannot detect faults that are latent in input data, such as data input data that passes validation checks but results in an incorrect output (such faults are sometimes referred to herein as "byzantine faults"). Detecting byzantine faults requires a functional knowledge of the underlying system that most automated testing frameworks do not possess. Although such faults may be detected by functional testing, functional tests often involve test cases that are manually created by people. As discussed above, such manual testing techniques are too limited to provide satisfactory assurances that a given system is fault-tolerant.

At least some of the embodiments of the technologies described herein address these problems by enabling a system to detect anomalous data at runtime that is indicative of a byzantine fault, and to provide real-time remediation. For example, input and output data streams of various components in the system can be analyzed to generate data patterns that characterize known good data patterns (e.g., a data "steady state" that characterizes a model for valid system operation). Using one or more of these patterns, deviations from the known steady state of operation can be detected and flagged as potential faults.

Additionally or alternatively, a specification can be defined that specifies allowed component interactions in the system. Such a specification can be defined using a domain-specific language ("DSL"). Such a specification can describe which components are allowed to communicate with one another, during which component states the components are allowed to communicate, and/or how the components are allowed to communicate with one another. The specification can be used to generate tests that can be used to validate the functional correctness of the system components. In at least come cases, passing the generated tests can be used as proof that the behavior of a given system conforms to its specification. Additionally or alternatively, the specification can be used at run-time to detect component interactions that are not allowed. Such a disallowed component interaction can be detected using the specification and flagged as a potential fault.

Although the examples described herein refer to automated vehicle systems and platforms, the technologies described herein can be applied to other types of computer systems as well.

In any of the examples described herein, a "vehicle component" refers to a part of an autonomous vehicle (such as wheels, tires, brakes, headlights, tail lights, brake lights, bumpers, radiators, shocks, spark plugs, etc.) as well as parts or systems for implementing autonomy in a vehicle, such as any of a variety of different sensors (e.g., LiDAR, RADAR, visible light cameras, humidity sensors, heat sensors, infrared), information acquisition systems (e.g., a global positioning system (GPS), cellular communication systems capable of receiving information over a local cellular network, short range communication systems (such as Bluetooth or near field communication (NFC)) capable of receiving information from devices of a passenger or driver or from another vehicle), etc. These parts or systems for implementing autonomy can also include hardware-specific chips and/or software modules configured to carry out operations for processing sensor data and acquired information. The operations can further comprise route planning and vehicle control to cause an autonomous vehicle to follow a planned route. Parts or systems for implementing autonomy can also include hardware and/or software modules configured to plan routes for autonomous vehicles, such as routes based on a mission objective (e.g., a destination) and conditions determined through the sensor data and acquired information (e.g., a location along a route, a location within a lane, locations of surrounding objects, upcoming traffic signs and signals). Further, the parts or systems can include hardware and/or software configured to control the vehicle to follow a planned route, such as systems that direct wheels to turn a determined amount, apply brakes at a determined pressure, cause the autonomous vehicle to accelerate a determined amount, etc. Vehicle components can comprise a variety of other parts or systems as well.

Examples of the disclosed technology include a fault-tolerant autonomous vehicle platform that comprises a safety architecture configured to detect and remediate component failures so that a safety-critical system can continue operating safely despite failure of individual components. The safety architecture can enable safety-critical systems to continue safe operation in degraded states. Additionally or alternatively, the safety architecture can enable state recovery for failed components to promote consistency among redundant components of the autonomous vehicle platform. For example, the safety architecture can be configured to determine when information from a given sensor is unreliable. Based on such a determination, the safety architecture can be configured to adapt to operate without using the information from that sensor, or using the information but with a low measure of confidence relative to information obtained from other sensors. When the safety architecture detects a component fault, the safety architecture can designate a degraded mode for operation of a safety-critical system. In the degraded mode, the safety-critical system can be considered reliable enough to continue operating.

FIG. 1 is a flowchart of an example method 100 for byzantine fault detection in an autonomous vehicle system. Any of the example systems described herein can be used to perform the example method 100. The illustrated method acts are shown by way of example only, as any one or more of the method acts may be omitted in certain embodiments, performed in a different sequence, performed concurrently, or replaced by some other actions. Also, additional method acts may also be included that are not illustrated here.

At 102, data streams for vehicle components are monitored. The vehicle component data streams can comprise sequences of data messages transmitted to and/or from vehicle components of an autonomous vehicle. One or more monitors of a fault detection subsystem of an autonomous vehicle platform can be configured to capture the data streams as they are transmitted between components of the system. For example, sequences of data messages sent from a vehicle sensor (such as a sequence of point maps transmitted by a LiDAR sensor component) can be monitored. For example, control signals transmitted to a vehicle control unit (such as signals transmitted to a steering control unit, a braking control unit, or the like) can be monitored.

In at least some embodiments, all or part of the component data streams can be received via a publication/subscription communication model. For example, data messages can be transmitted by a publishing component to subscribing components via one or more channels of a communication bus. In such a configuration, the data streams can be monitored with little to no impact on the communication throughput between the components.

At 104, normal operation data patterns are identified using the monitored data. One or more models can be generated that characterize "normal" or expected patterns of data activity. Machine learning techniques (such as neural networks, etc.) can be used to generate the one or more models based on the data streams. In at least some embodiments, a separate model is generated for each monitored vehicle component. Additionally or alternatively, sequences of communications between the vehicle components can be modeled. For example, predictable correlations may be detected between input data values received at a component and output data transmitted by the component (such as one or more data point messages received by a component from a LiDAR sensor and one or more control signals sent by the component to a steering control unit). Detected patterns may include expected ranges of message values (and/or expected sequences of message value ranges), expected message frequencies (such as heartbeat message frequencies, expected maximum response times, etc.) for various components, or some combination thereof. Other types of detected patterns are also possible.

In at least some embodiments, the one or more models are generated during one or more training phases in which observed data streams are presumed to represent normal vehicle operation.

At 106, anomalous data is detected using the identified data patterns. The one or more generated models can be used to analyze data streams that are subsequently transmitted between the vehicle components. In at least some embodiments, the one or more models can be used as classifiers that provide a statistical probability (based on the observed "normal mode" data patterns) that the subsequently monitored data streams represent normal vehicle component operation. For example, if a given component historically transmitted data messages with values within a certain range, and messages are observed that fall outside that range, the deviation from the historical trend may indicate that the component has entered a fail state. For example, if historically certain patterns of data inputs to a vehicle component consistently resulted in certain patterns of data outputs from the vehicle component, then outputs that deviate significantly from the observed pattern may indicate that the vehicle component has encountered a failure state.

At 108, a potential fault alert is raised. The fault alert can comprise one or more messages transmitted to fault detection and remediation module of an autonomous vehicle platform. The alert can comprise data (or a pointer to data) about a potential fault that was detected based on the anomalous data. In at least some embodiments, a threshold can be specified that indicates a point at which detected deviant data constitutes a fault condition. For example, in an embodiment where a generated model provides a value indicating a statistical likelihood that observed data represents normal behavior of a vehicle component, the specified threshold can indicate a statistical confidence (such as 80%) below which the observed data is determined to constitute a potential fault.

The example method 100 can be performed repeatedly during operation of an autonomous vehicle. Additionally or alternatively, the example method 200 can be performed during development and testing of vehicle components to assist in development and/or debugging processes. In at least some cases, the potential fault alert can be displayed to a developer, tester, or vehicle operator. The receiver of the alert can respond with a message indicating that a fault has or has not occurred. This received feedback can be used to further train the one or more models used to detect the anomalous data. However, during real-time vehicle operation, the fault detection and remediation subsystem may need to take immediate remedial action instead of waiting for confirmation of a detected potential fault.

Figure 2:
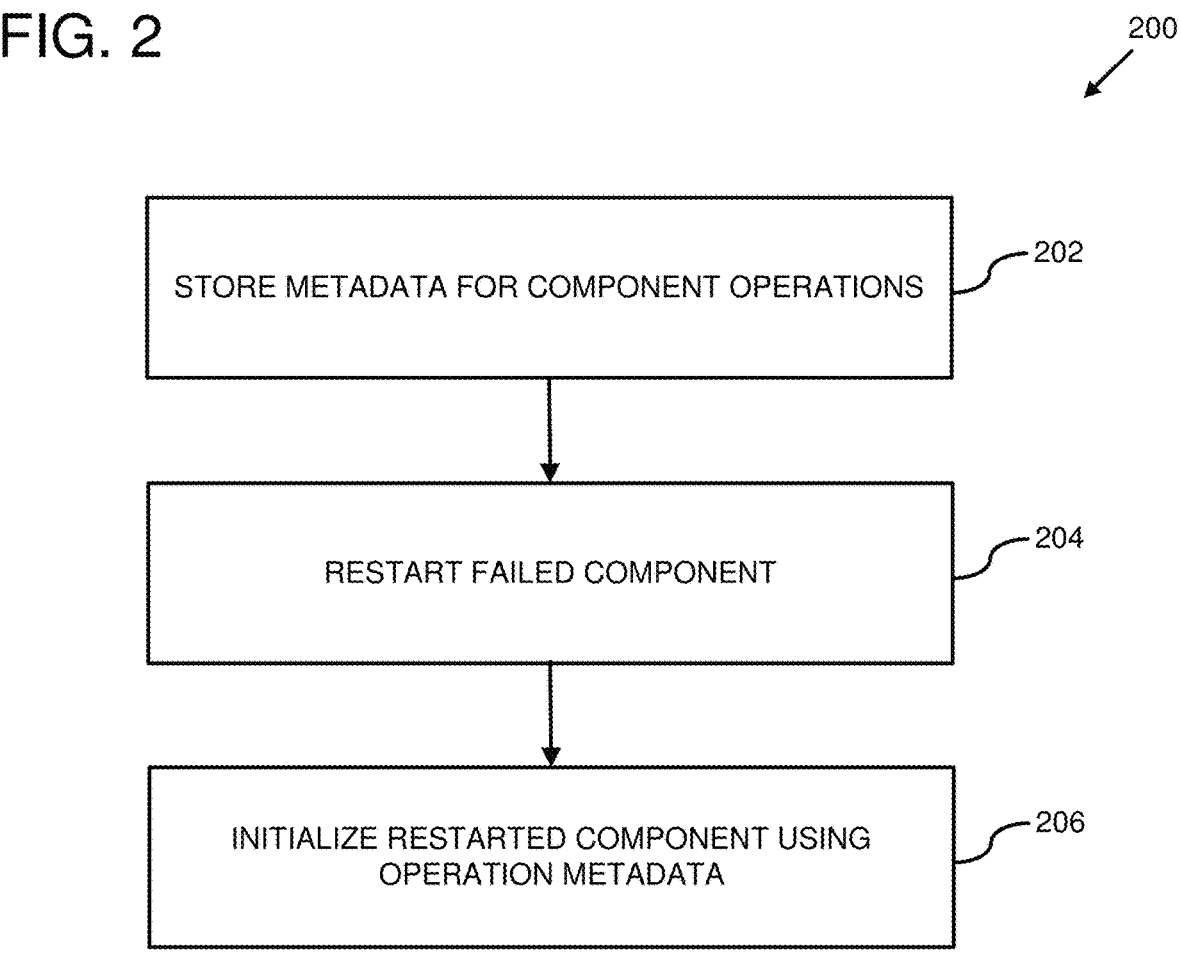
FIG. 2 is a flowchart of an example method for performing remediation of a detected faulty component.

FIG. 2 is a flowchart of an example method 200 for performing remediation of a detected faulty component. Any of the example system described herein can be used to perform the example method 200. The illustrated method acts are shown by way of example only, as any one or more of the method acts may be omitted in certain embodiments, performed in a different sequence, performed concurrently, or replaced by some other actions. Also, additional method acts may also be included that are not illustrated here.

At 202, operation metadata is stored for vehicle components in an autonomous vehicle. The operation metadata can comprise data describing messages received and/or transmitted by various vehicle components during operation of the autonomous vehicle. In at least some embodiments, the metadata can be generated using data messages transmitted between components of the automated vehicle, as described herein. A fault detection and remediation subsystem of an autonomous vehicle platform can be configured to monitor the data messages transmitted between the components and to generate and store the operation metadata. For example, component operations can be inferred inputs to a component and subsequent outputs from the component. The component operation metadata can describe sequences of such inputs and outputs. In at least some embodiments, operation metadata records comprise sequence identifiers (such as timestamps) that indicate an order in which various operations occurred in the autonomous vehicle platform. For example, the autonomous vehicle platform can comprise a communication bus that is used to transmit messages between various components of the automated vehicle. The messages can be monitored as they are transmitted across the bus and used to generate metadata operation records, wherein an operation record can comprise a message's contents, a sender of the message, a receiver of the message, and/or a time that the message was transmitted.

In at least some cases, operation metadata does not need to be recorded for all messages. For example, messages that affect vehicle component state can be captured and used to generate operation metadata, while messages that do not affect component state can be ignored.

The autonomous vehicle can comprise redundant components in order to ensure continued safe operation of the vehicle in the event of a component failure. Thus, if one component fails, other components of a same or similar type can step in an enable the vehicle to continue to operate in a degraded state.

At 204, the failed component is restarted. However, in a scenario where a given component fails and the rest of the system continues to function, if the component is brought back online, there can be a mismatch between a last recorded state of the component and the rest of the system. In some cases, this can lead to erroneous behavior of the restarted component.

At 206, the operation metadata is used to initialize the restarted component. The operation metadata records can be used during an initialization sequence of the component to update the state of the component to match the state of the rest of the system (or to match the state of redundant components that performed operations for the component while it was offline).

In a scenario where redundant components are connected in a distributed system comprising multiple host nodes, the multiple components of the distributed system can be configured to record metadata for a sequence of operations performed by the system. Various strategies exist for maintaining consistency of components in a distributed system, such as two-phase commit strategies. However, most two-phase commit strategies have limitations where, in certain scenarios, they are unable to guarantee the consistency of different components in the event that one component encounters a failure. For example, some strategies involve so-called "eventual consistency" models, where disparate components can handle transactions independently and then transmit messages to one another to "eventually" achieve a consistent state. However, in the event that a component in such a system fails, when it is brought back online, it may have a state that deviates significantly from the current states of other components until it is updated by messages received from the other components. For mission critical systems, allowing such a component to perform operations before it has reached a consistent state may have negative (perhaps disastrous) consequences.

To address this problem, the operation metadata can be recorded for sequences of operations performed by components in the distributed system. Such metadata can be stored in a centralized data store where it is accessible by separate components of the system. Alternatively, the data store can comprise distributed data storage. Such distributed data stores can, in at least some cases, reduce the risk that the data store will become a single point of failure. Example distributed data storages include a distributed system comprising multiple storage nodes. In a particular embodiment, the data store comprises multiple, consensus-driven storage nodes in which the storage nodes are configured to reach a consensus regarding a current state of the system.

Additionally or alternatively, the operation metadata records can be timestamped to indicate a sequence of operations performed by the components in the system. A component can maintain an indicator state (such as a timestamp, pointer, or the like) that identifies a "current" or "latest" operation of which the component is aware. If the component fails, when it is restarted it can be initialized using the operation metadata records that have been entered since its failure (e.g., newer records than the operation metadata record identified by the component's indicator state) in order to update its state based on the operation metadata. This can be done as part of an initialization sequence of the component that is performed before the component is allowed to perform further operations.

Figure 3:
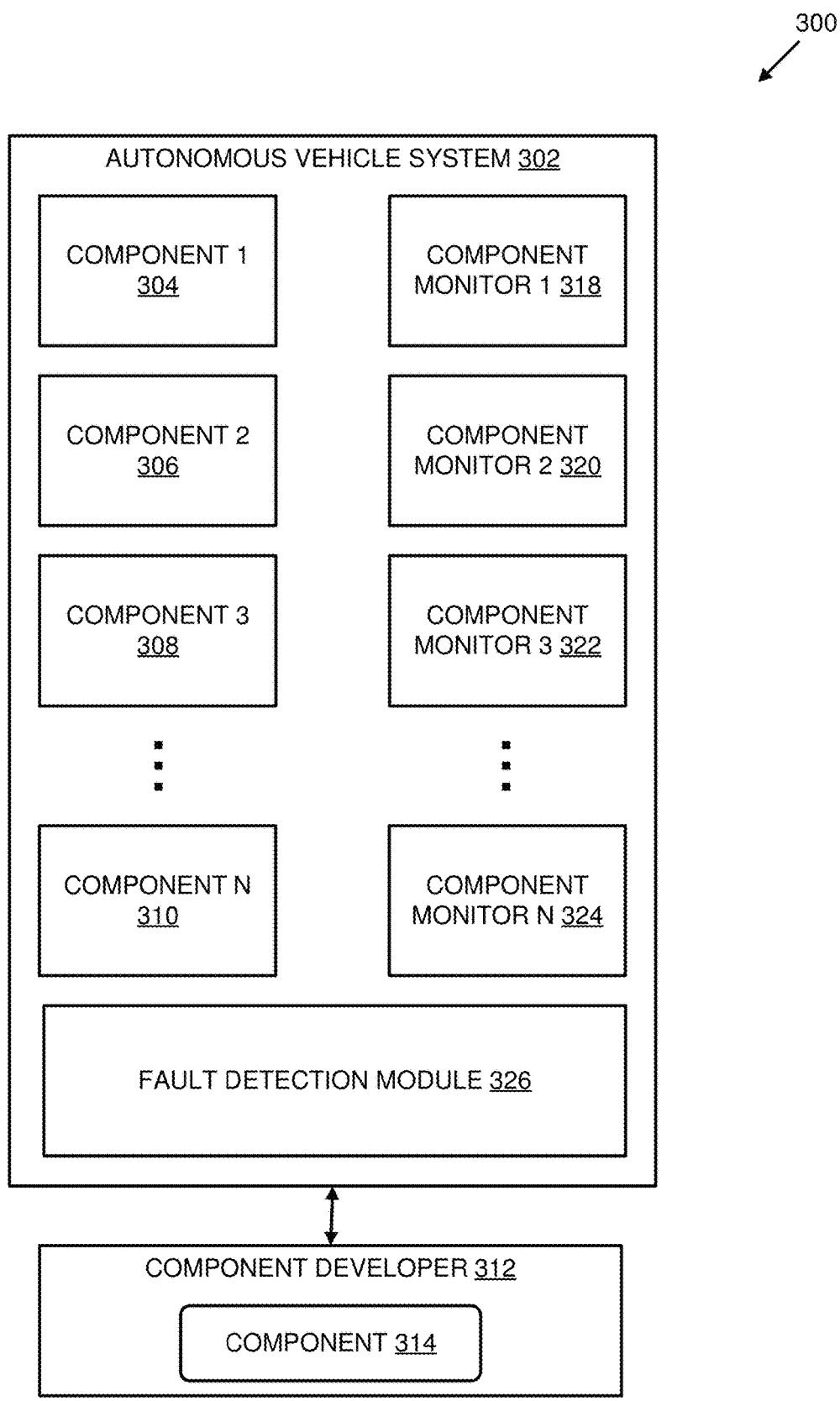
FIG. 3 is a system diagram of an example system comprising an autonomous vehicle system configured to perform fault detection operations for one or more vehicle components of an autonomous vehicle.

FIG. 3 is a system diagram of an example system 300 comprising an autonomous vehicle system 302 configured to perform fault detection operations for one or more vehicle components 304-310 of an autonomous vehicle (not shown). The autonomous vehicle system 302 can be embedded in the autonomous vehicle and configured to operate (or assist in operation of) the autonomous vehicle using the components 304-310. The vehicle components 304-310 can comprise sensors and/or control units and actuators of the autonomous vehicle. Additionally or alternatively, the components 304-310 can comprise hardware and/or software components configured to interface with sensors and/or control units and actuators of the autonomous vehicle.

The example environment 300 comprises a component developer 312 which represents functionality to develop any of a variety of different vehicle components for the autonomous vehicle 302. Given this functionality, the component developer 312 is depicted with an autonomous vehicle (AV) component 314, which may correspond to a component being developed or already developed by the component developer 312. By way of example, the AV component 314 may correspond to any one of the components 304-310, different components for the autonomous vehicle, and/or components for different autonomous vehicles. The ability of the component developer 312 to integrate the AV component 314 with the autonomous vehicle system 302 is illustrated through the depicted connecting arrow.

The autonomous vehicle system 302 can comprise one or more component monitors 318-324 associated with the various components 304-310. In at least some embodiments, each component may be associated with a separate monitor. For example, component 304 can be associated with the component monitor 318, the component 306 can be associated with the component monitor 320, and so on. When a component is incorporated into the autonomous vehicle system 302, a safety architecture may be configured to associate instantiate a component monitor and associated it with the component.

A component monitor can be configured to monitor data streams for an associated component and to generate one or more data patterns that characterize a steady state (or normal mode of operation) for the component. For example, the component monitor can be configured to observe inputs and/or outputs of an associated component and to generate one or more models that characterize one or more expected sequences of inputs and/or outputs for the associated component. The component monitor can be configured to analyze monitored data and determine if it deviates from an associated model. If monitored data deviates significantly from an expected pattern, it can be identified as a potential fault or failure condition. In at least some embodiments, a monitor can support a training mode in which data for an associated component is monitored and one or more models for the component's normal operation are generated, and an analysis mode in which the one or more generated models are used to analyze monitored data for the associated component and identify potential faults.

Additionally or alternatively, a component monitor can be configured to check data messages received and/or transmitted by a component using a specification that defines valid interactions between components of the system. For example, the monitor can determine whether a message received by the monitored component is sent by a component that is authorized to communicate with the monitored component. For example, the monitor can determine whether a message transmitted by the monitored component to another component is authorized. In at least some cases, the specification can define component states during which certain communication with or from the monitored component is allow. In such a case, the monitor can check a current state of the monitored component to determine whether a communication to or from the monitored component is authorized. If the monitor detects an unauthorized communication, the monitor can identify the communication as a potential fault.

The autonomous vehicle system 302 can comprise a fault detection module 326 that can be configured to manage the monitors 318-324. The fault detection module 326 can be configured to instantiate the component monitors 318-324. Additionally or alternatively, the fault detection module 316 can be configured to receive event messages from the component monitors when one or more potential faults are detected. The fault detection module 326 can be configured to analyze received fault detection messages and determine whether a fault has occurred in one or more of the components 304-310. For example, the fault detection module 326 may be configured to determine that a component has encountered a fault condition if a specified number of fault detection messages associated with the given component are received within a given time period. Additionally or alternatively, the fault detection module 326 can be configured to identify a failed component based on a series of received messages. For example, a failed component may cause a chain reaction in which one or more downstream components receive and/or transmit data that trigger multiple fault detection messages. The fault detection module 326 can be configured to analyze the sequence of received fault detection messages and identify the root failed component.

In at least some embodiments, the component monitors 318-324 and the fault detection module 326 integrate into a safety architecture that enables the component monitors 318-324 to subscribe to receive operational data messages that are published by the associated components 304-310. In at least some embodiments, the safety architecture supports a message-passing protocol between the component monitors 318-324 and the fault detection module 326. An example advantage of such an approach is that it allows developers of the safety architecture to focus on developing the safety architecture rather than focusing on how to make each individual component safe.

The fault detection module 326 can be configured to perform remediation operations to mitigate a detected component failure. For example, the fault detection module 326 can be configured to identify one or more redundant components for the failed component and to offload a workload being performed by the failed component to one or more of the identified components. Additionally or alternatively, the fault detection module 312 can be configured to restart or reinitialize the failed component.

In at least some embodiments, the component monitors 318-324 and the fault detection module 326 can operate independently from a "normal" operation of the autonomous vehicle components 304-310. As used herein, the "normal operation" of autonomous vehicle components refers to operations to sense conditions in a driving environment, plan a route through the environment, and/or control one or more components of the autonomous vehicle to drive the autonomous vehicle according to the planned route. The normal operation does not include functionality to detect and mitigate failures of the components 304-310 used to carry out the sensing, planning, and controlling. For example, a component monitor can check that an output of an associated component is accurate and is provided by the component in a timely fashion. A component may be associated with criteria indicative of normal operation, e.g., that describe a format in which the component is configured to supply data, a frequency with which the component is to supply the data (e.g., every 0.5 seconds), whether the component supplies the data when polled, etc. In this way, a component monitor can determine whether a component supplies data in a timely fashion. If a component fails to operate according to its criteria, the component monitor associated with the component may generate and communicate a message to the fault detection module 326. The fault detection module can be configured to determine actions to take based on the detected failure.

Figure 4:
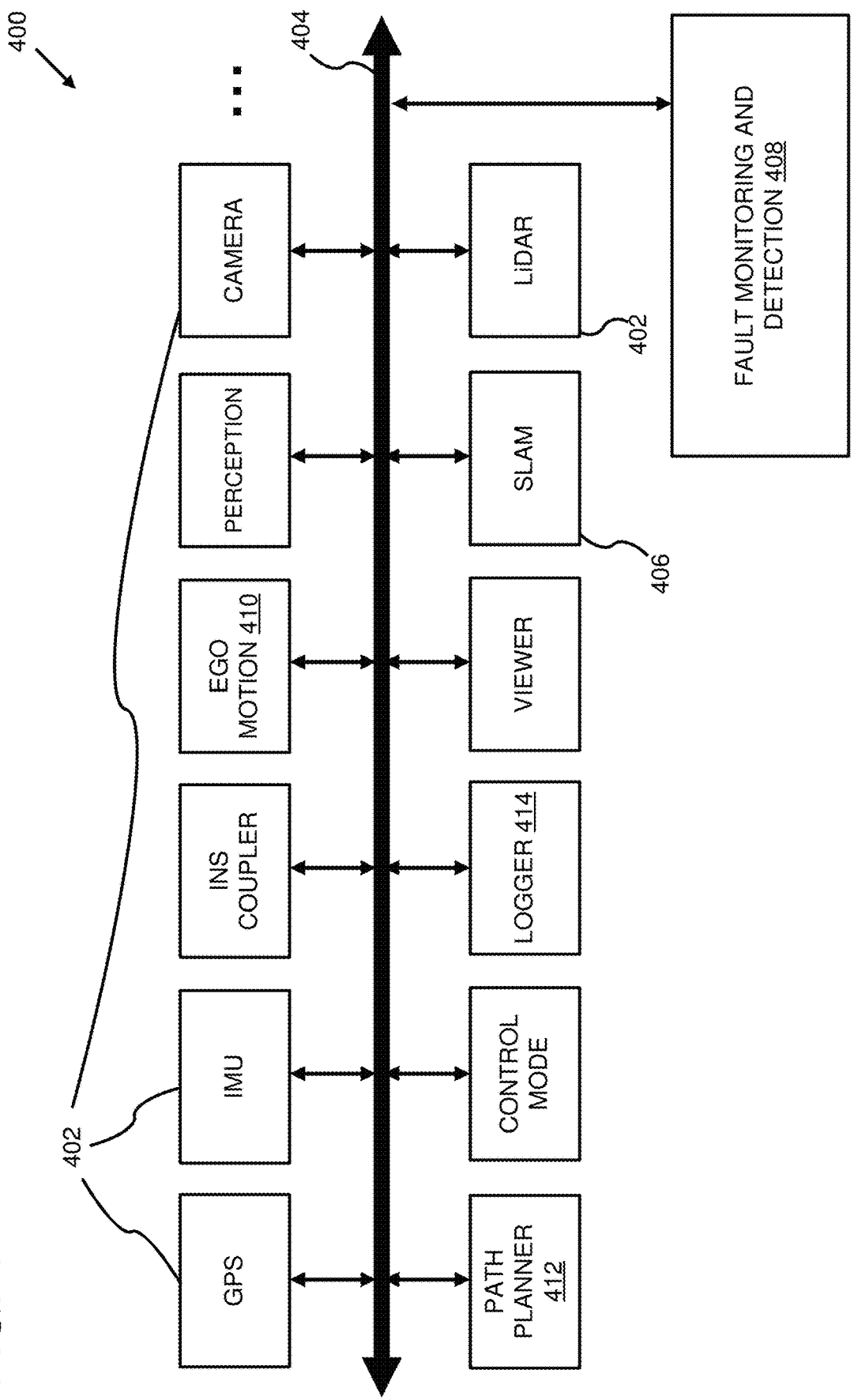
FIG. 4 is a system diagram of an example system that can be utilized to implement embodiments of an autonomous vehicle platform and safety architecture.

FIG. 4 is a system diagram of an example system 400 that can be utilized to implement embodiments of an autonomous vehicle platform and safety architecture, as described herein. In at least some embodiments, the system 400 can be implemented as a publisher-subscriber architecture, in which applications publish and subscribe to topics that are available to every application (e.g., software applications) on the bus. Additionally or alternatively, the system 400 can be implemented as a hybrid model that includes the publisher-subscriber architecture, as well as a get-set framework that provides one or more applications the ability to request and receive certain parameter values. For example, an application can be queried for its health status and/or current operating state, and the requested status and/or operating state can be received in response. Additionally or alternatively, an operating state of the application can also be set. Such a hybrid embodiment can represent the strengths of the communication modes of both a publisher-subscriber architecture and a get-set framework. For example, some data in the autonomous vehicle platform and safety architecture may need to be sent out via a high bandwidth communication channel via the publisher-subscriber architecture (such as image data from a camera that is continually streamed to subscribing applications). In contrast, status information may only need to be communicated periodically, such as to indicate a status change or when requested. The get-set framework can be used to analyze and adjust the operational health of the various system nodes, and in the context of reliability and/or used to check system node status with settable trouble codes.

The example system 400 incorporates multi-sensor parsing for a various different types of sensors 402, such as vision, radar, LiDAR, IMU, GPS, camera, and any other types of sensors that may be utilized in an autonomous vehicle system. In at least some embodiments, each of the sensors 402 is representative of a sensor or an individual host system that can include computer and/or sensor hardware, as well as the related software and applications implemented for each host that participates (e.g., as a publisher and/or a subscriber) in the system via a communication bus 404. The communication bus 404 can be configured as a unified publisher-subscriber and/or get/set data bus in accordance with one or more embodiments. The system 400 can implement synchronization, motion correction, fusion, visualization, logging, and/or any other types of sensor and data processing.

The system 400 can provide support for multiple different operating systems (e.g., WINDOWS, LINUX, etc.), as well as multiple types of communication interfaces (e.g., CAN interfaces, TCP/IP, UDP, serial, USB, etc.). The system 400 can comprise one or more plug-and-play sensors. A standardized API can be used to model data abstractions in order to swap and/or upgrade sensors as-needed. The system 400 can comprise feature-rich visualization and/or a control GUI. The example system 400 can be configured to provide low-level data fusion, sophisticated filtering, and motion compensation in a fast, efficient, scalable, and embeddable data framework. The system 400 can comprise a viewer component configured to provide logging and playback, 3D data visualization, system monitoring, configuration, and/or management for various other components of the system.

In at least some embodiments, the system 400 can utilize a high assurance message transport protocol. The protocol can be a protocol that supports lightweight encoding and decoding (such as Fast Common Data Representation (FastCDR), Lightweight Communications and Marshalling (LCM), Simple Binary Encoding (SBE), protocol buffers, or the like). The various components of the system 400 can be configured to communicate with one another by transmitting messages over the communication bus 404 using the transport protocol. Such a configuration can reduce inter-process dependencies and provide a reliable, fault-tolerant, high-bandwidth middleware. Using such a protocol and encoding/decoding mechanism can provide low latency throughput for messages (such as streaming sensor data).

The system 400 can comprise multiple distributed nodes. In such a configuration individual nodes can fail without affecting the integrity of the data bus 404 or the overall system. For example, an obstruction in the pathway of a vehicle may cause an unexpected failure of a simultaneous localization and mapping (SLAM) algorithm at 406. However, the failure at the one node may not affect the data communications and messaging between the other nodes connected to the communication bus 404. In at least some embodiments, the distributed nodes can comprise separate hardware components. At least some of the nodes can comprise redundant hardware components, such that the functions performed by a given node may be performed by one or more other nodes in the event that the given node encounters a failure.

Other examples of distributed nodes can include a node 410 configured to perform ego motion operations using data received from one or more of the sensors 402 via the communication bus 404; a path planned node 412 configured to perform path plannging for an autonomous vehicle based on sensor data received from one or more of the sensors 402 via the communication bus 404, a logger node 414 configured to perform event logging operations for an autonomous vehicle based on data received from one or more of the sensors 402 and or one or more other distributed nodes via the communication bus 404, etc.

The system 400 comprises a fault monitoring and detection node 408. The fault monitoring and detection node 408 can be connected to the communication bus 404. The fault monitoring and detection node 408 can be configured to monitor messages transmitted between the system component nodes via the bus 404. The fault monitoring and detection node 408 can be configured to construct one or more normal operation mode models or the various components of the system 400 based on the observed messages. The fault monitoring and detection node 408 can analyze observed messages using the one or more models to detect deviations from normal operation data patterns that may indicate failure conditions.

In at least some embodiments, the fault monitoring and detection node 408 can be configured to analyze observed communications using one or more specifications that define valid interactions between the components of the system. Using the one or more specifications (on optionally state and/or status information for the components obtained via the communication bus 404) the fault monitoring and detection node 408 can determine whether unauthorized interactions between components are taking place.

The fault monitoring and detection node 408 can be configured to perform remediation operations in the event that a failure condition is detected. Remediation operations can include isolating a failed component. For example, the fault monitoring and detection node 408 can transmit one or more messages to prevent the failed component from receiving subsequent messages via the communications bus 404. The fault monitoring and detection node 408 can be configured to route messages that would have been received by the failed component to one or more fail-over components instead. Additionally or alternatively, the fault monitoring and detection node 408 can be configured to restart or reinitialize a failed component. In at least some embodiments, the fault monitoring and detection node 408 can be configured to initialize the restarted or reinitializing component using metadata for operations that were performed while the component was offline.

Figure 5:
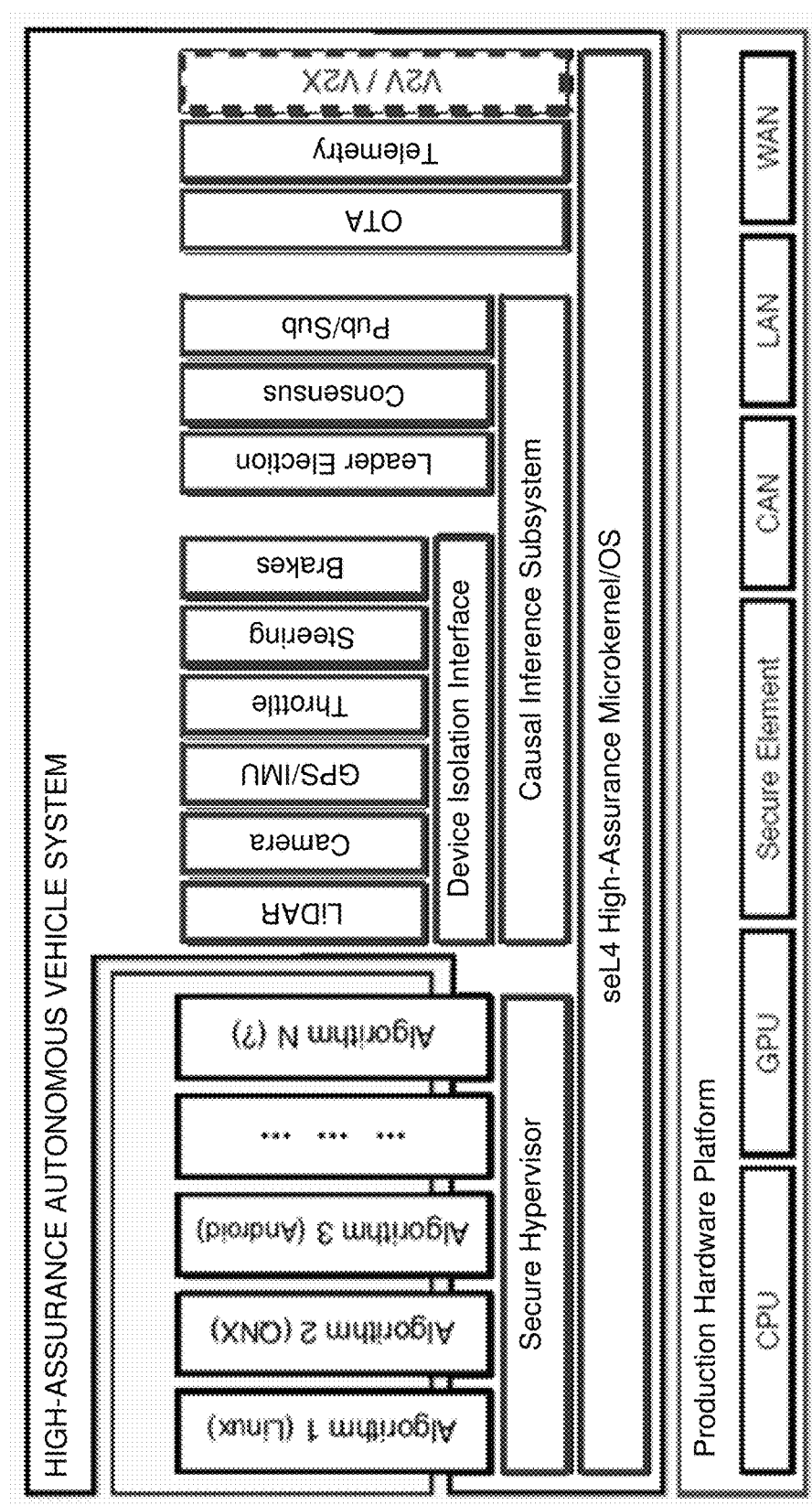
FIG. 5 is a system diagram depicting another example system in which at least some of the disclosed technologies can be implemented.

FIG. 5 is a system diagram depicting another example system in which at least some of the disclosed technologies can be implemented. A high-assurance microkernel or operating system can be provided that is configured to act as an intermediate layer (or middleware) between one or more unverified end-user applications and vehicle components. One or more end-user applications can be executed within a secure hypervisor that is configured to interface with the intermediate layer. Multiple sensor components (such as LiDAR sensors, cameras, GPS/IMU devices, etc.) and multiple control units (such as a throttle control unit, a steering control unit, a braking control unit, etc.) can be coupled to a device isolation interface of a causal inference subsystem. The causal inference subsystem can further comprise a publication/subscription communication model that enables communication between the one or more applications and the various sensors and/or control units. The secure hypervisor and the causal inference subsystem can be configured to route messages between the applications and the vehicle components using a communication bus (not shown) of the intermediate layer.

The causal inference subsystem can be configured to monitor data transmissions between the applications and the various components and to generate models of normal operation patterns of the system 500. The causal inference subsystem can be configured to detect data transmissions that represent significant deviations from the generated models and to determine whether the deviant data transmissions indicate a system fault. The causal inference subsystem can analyze recorded sequences of data traffic that result in the deviant data transmissions to identify a component that is a root cause of the fault condition.

Additionally or alternatively, the causal inference system can be configured to analyze monitored data transmissions using a system specification. The system specification can define expected interactions between the one or more applications and the various vehicle components. For example, the specification can define capabilities and known states of the various components, and can define rules for communication with (and/or between) the various components. In at least some embodiments, the specification can be defined using a DSL. If a data transmission (and/or behavior of an application or component) is observed that does not conform to the specification, the application of the component that sent the data transmission can be identified as being in a potential fail state. The causal inference system can be configured to perform diagnostics on the identified application or component and/or to perform remediation operations against the identified component or application using techniques as described herein.

The causal inference subsystem can be configured to isolate a failed component via the device isolation interface. In embodiments where multiple redundant components are provided, the causal inference subsystem can be configured to route messages for the failed component to one or more other components configured to perform the same or a similar function. In at least some embodiments, multiple components are spread across multiple distributed nodes. In such embodiments the causal inference subsystem can be configured to use leader election and consensus modules to coordinate the multiple nodes and to maintain consistent state across the multiple nodes.

In a scenario where it is determined that one of the one or more applications is in a fail state, the causal inference subsystem can be configured to transmit one or more commands via the intermediate layer to the secure hypervisor to isolate the application. For example, a communication bridge of the secure hypervisor connecting the application to the intermediate layer can be disabled. Additionally or alternatively, a virtual machine running on the hypervisor in which the application is executed can be shut down or restarted. In at least some embodiments, the causal inference subsystem can be configured to restart the application on another node. For example, in a scenario where a node has encountered a hardware failure, the application can be restarted on another hypervisor on another node.

The causal inference subsystem can be configured to record operation metadata for a sequence of operations performed using one or more of the system components and applications. In the event that a component or application is restarted (such as in an attempt to restore a failed component), the recorded operation metadata can be used to update a state of the restarted component to match a current state of other components in the system (such as other components of a same type as the restarted component that we used to perform operations while the restarted device was offline).

Figure 6:
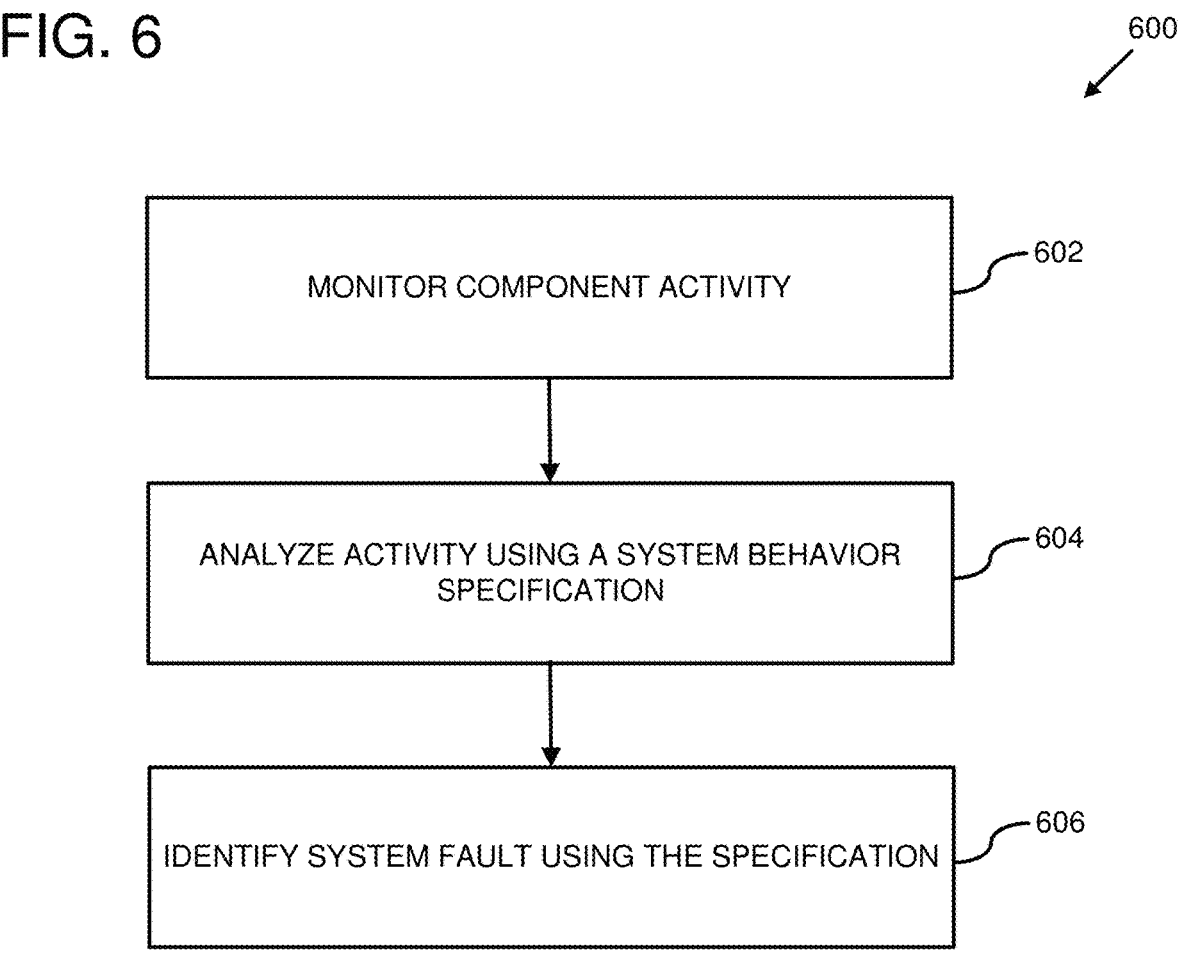
FIG. 6 is a flowchart of an example method for identifying faults using a system behavior specification.

FIG. 6 is a flowchart of an example method 600 for identifying faults using a system behavior specification. Any of the example systems described herein can be used to perform the example method 600. The illustrated method acts are shown by way of example only, as any one or more of the method acts may be omitted in certain embodiments, performed in a different sequence, performed concurrently, or replaced by some other actions. Also, additional method acts may also be included that are not illustrated here.

At 602, data activity for vehicle components in an autonomous vehicle is monitored. The data activity can comprise messages transmitted between various vehicle components via an autonomous vehicle platform. In at least some embodiments, component data streams are monitored that comprise sequences of data messages transmitted to and/or from vehicle components of an autonomous vehicle. One or more monitors of a fault detection subsystem of the autonomous vehicle platform can be configured to capture the data messages as they are transmitted between components of the system.

At 604, the data activity is analyzed using a system behavior specification. The specification can be defined using a DSL or some other format. The specification can comprise one or more declarative rules that define expected components of the autonomous vehicle and their expected communications.

Figure 7:
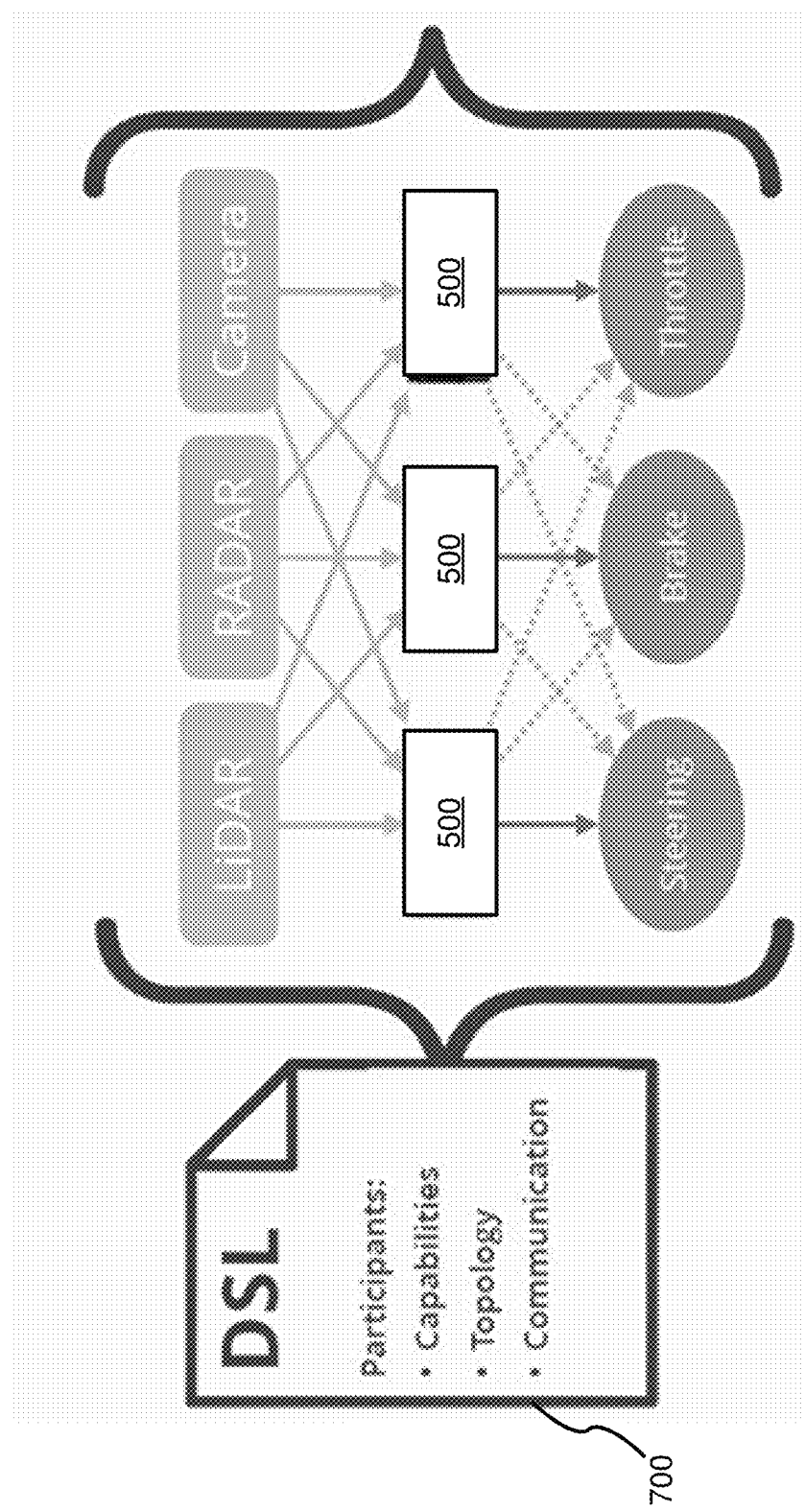
FIG. 7 depicts a relationship between an example system behavior specification and components of an autonomous vehicle system.

FIG. 7 depicts a relationship between an example system behavior specification 700 and components of an autonomous vehicle system (such as example system 500). The specification 700 can define valid components that should be allowed to participate in the system, as well as various supported capabilities of the components. The specification 700 can define a topology of connections between the various components. For example, the specification 700 can comprise definitions of logical connections between various components that describe authorized communication channels between the components. Additionally or alternatively, the specification 700 can define types of communications (such as message types, message frequencies, message sizes, etc.) that are expected between various components.

In at least some embodiments, the specification 700 can define rules for communication in the event of component failure. For example, a given component may be authorized to transmit messages to another component only in the event that a primary component is offline. Messages transmitted by the component when the primary component is still online may be viewed as fault conditions.

Returning to FIG. 6, at 606 a system fault is identified using the system behavior specification. Monitored data activity can be checked using the specification to determine whether the data activity is expected (or authorized). If the data activity is not expected (or authorized) based on the specification, then the data activity can be identified as a system fault. For example, data activity may be detected that is transmitted by a first component to a second component. If the specification does not authorize the communication from the first component to the second component, then the data activity may be flagged as a potential fault. In some scenarios, sequences of data messages can be analyzed to trace multiple unauthorized communications to a root faulty component.

A component that transmitted the data activity can be identified as a potentially faulty component and can be isolated and/or restarted. In at least some embodiments, a fault detection subsystem of the autonomous vehicle platform can be configured to intercept data messages and to block the data messages from reaching destination components if it is determined that the data messages are unauthorized.

In some cases, a system behavior specification can be defined and used to validate vehicle components during development and testing. For example, the definitions in the specification can be used to generate test cases that can be used to determine whether vehicle components are performing according to the specification. In at least some embodiments, such specification-based testing can be used as part of a commit-gate to ensure that code changes to not break a system's conformance to the specification. The specification-based testing can be used to provide a certification that the behavior of deployed vehicle components conforms to the associated specification.

Figure 8:
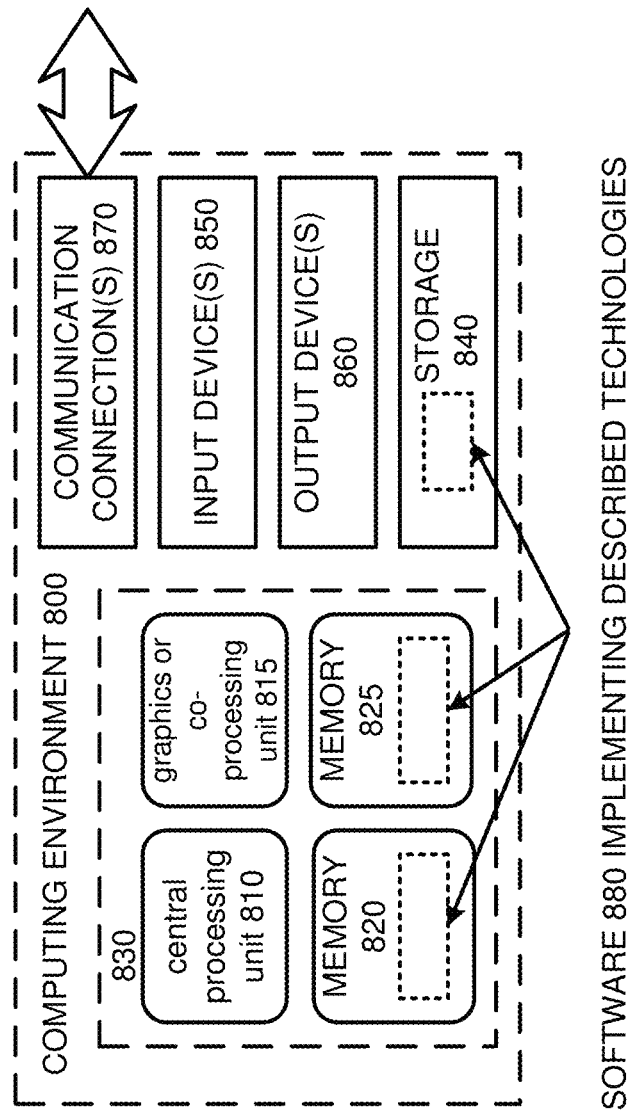
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

In at least some embodiments, the computing environment 800 can be a vehicle component or node as described herein.

A computing system may have additional features. For example, the computing environment 800 includes storage 840, one or more input devices 850, one or more output devices 860, and one or more communication connections

870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein. In some embodiments, storage 840 comprises one or more of the example storage devices as described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention.

What is claimed is:

1. A system for detecting faults in autonomous vehicle operation, the system comprising:
   a vehicle component monitor configured to:
      monitor data activity of a vehicle component of an autonomous vehicle, including monitoring communications to and from the vehicle component;
      generate a normal operation model for the vehicle component based on one or more data patterns in the monitored data activity, wherein the one or more data patterns characterize valid operation of the vehicle component;
      detect anomalous data activity using the normal operation model for the vehicle component;
      determine whether the communications to and from the vehicle component are authorized; and transmit a message indicating that a fault has been detected in the vehicle component based on the detection of anomalous activity or the determination of an unauthorized communication; and a fault detection module configured to:
receive the message from the vehicle component monitor;
isolate the vehicle component; and
identify at least one redundant component that performs the same function as the vehicle component, and offload a workload of the vehicle component for which a fault has been detected to the at least one redundant component.

2. The system of claim 1, wherein the fault detection module is further configured to restart the isolated vehicle component.

3. The system of claim 2, wherein the fault detection module is further configured to:
store vehicle component metadata for the vehicle component based on the detected anomalous data activity; and
initialize the restarted vehicle component using the stored metadata.

4. The system of claim 1, wherein:
the vehicle component monitor is further configured to analyze the data activity of the vehicle component using a system behavior specification; and
the detecting anomalous data activity comprises determining that data activity of the vehicle component does not conform to the system behavior specification.

5. The system of claim 4, wherein the vehicle component monitor is further configured to:
generate a test using the system behavior specification; and
execute the generated test to validate the functionality of the vehicle component.

6. The system of claim 1, wherein:
the detecting anomalous data activity comprises detecting anomalous activity of an application of the vehicle component; and
the vehicle component monitor is further configured to determine, based on the anomalous activity of the application, that the application of the vehicle component is in a fail state.

7. The system of claim 6, wherein the fault detection module is further configured to:
stop the execution of the application on the vehicle component; and
start another execution of the application on another vehicle component.

8. A computing device comprising a processor and a memory storing executable instructions that, when executed by the processor, cause the computing device to perform operations, the operations comprising:
monitoring data activity for a vehicle component of an autonomous vehicle, including monitoring communications to and from the vehicle component;
analyzing the monitored vehicle component data activity using a system behavior specification for the autonomous vehicle, wherein the analyzing determines, based at least in part on a current state of the monitored vehicle component, whether at least one communication of the monitored vehicle component is not authorized;
determining that the monitored vehicle component data activity does not conform to the system behavior specification;

taking the vehicle component offline; and
identifying at least one redundant component that performs the same function as the vehicle component taken offline, and offloading a workload of the vehicle component taken offline to the at least one redundant component.

9. The computing device of claim 8, wherein the operations further comprise restarting the offline vehicle component.

10. The computing device of claim 9, wherein the operations further comprise:
storing vehicle component metadata based on the analyzed vehicle component data activity; and
initializing the restarted vehicle component using the stored metadata.

11. The computing device of claim 8, wherein the operations further comprise:
generating a test using the system behavior specification; and
using the generated test to determine that the monitored vehicle component data activity does not conform to the system behavior specification.

12. The computing device of claim 8, wherein the operations further comprise:
determining that an application of the vehicle component is in a fail state; and restarting the application.

13. The computing device of claim 12, wherein restarting the application comprises:
stopping the execution of the application on the offline vehicle component; and
starting another execution of the application on another vehicle component.

14. The computing device of claim 8, wherein the operations further comprise:
generating a normal operation model for the vehicle component based on the monitored data activity; and
detecting anomalous data activity using the normal operation model for the vehicle component.

15. A method for detecting faults in autonomous vehicle operation, the method comprising:
monitoring data activity for a plurality of vehicle components of an autonomous vehicle, including monitoring communications to and from the plurality of vehicle components;
determining, based at least in part on a current state of the plurality of vehicle components, whether the communications are authorized;
identifying, based at least in part on the monitored data activity, a pattern for normal operation of the autonomous vehicle, wherein the pattern characterizes valid operation of the autonomous vehicle;
detecting vehicle component data activity that deviates from the identified pattern for normal operation of the autonomous vehicle;
determining that a fault has occurred in a vehicle component, of the vehicle components, based on a determination that a communication is not authorized or the detection of data activity that deviates from the identified pattern for normal operation;
identifying at least one redundant component that performs the same function as the vehicle component for which a fault has occurred, and offloading a workload of the vehicle component for which a fault has occurred to the at least one redundant component;
restarting the vehicle component for which a fault has occurred; and
initializing the restarted vehicle component.

16. The method of claim 15, further comprising:
storing vehicle component metadata based on the detected vehicle component activity; and
initializing the restarted vehicle component using the stored metadata.

17. The method of claim 15, further comprising:
analyzing the monitored vehicle component data activity using a system behavior specification; and
wherein the determining that a fault has occurred in the vehicle component comprises determining that the detected vehicle component data activity does not conform to the system behavior specification.

18. The method of claim 17, further comprising:
generating a software test program using the system behavior specification; and
executing the generated software test program to test the vehicle component.

19. The method of claim 15, wherein:
determining that the fault has occurred in the vehicle component comprises determining that an application of the vehicle component is in a fail state; and
the method further comprises restarting the application.

20. The method of claim 19, wherein restarting the application comprises:
stopping the execution of the application on the vehicle component; and starting another execution of the application on another vehicle component.

* * * * *